United States Patent
Sugawa

(10) Patent No.: US 9,137,469 B2
(45) Date of Patent: Sep. 15, 2015

(54) SOLID-STATE IMAGING DEVICE

(71) Applicants: TOHOKU UNIVERSITY, Miyagi (JP); OLYMPUS CORPORATION, Tokyo (JP)

(72) Inventor: Shigetoshi Sugawa, Sendai (JP)

(73) Assignees: TOHOKU UNIVERSITY, Tokyo (JP); OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/302,516

(22) Filed: Jun. 12, 2014

(65) Prior Publication Data
US 2014/0293105 A1 Oct. 2, 2014

Related U.S. Application Data

(63) Continuation of application No. PCT/JP2012/082141, filed on Dec. 12, 2012.

(30) Foreign Application Priority Data

Dec. 13, 2011 (JP) .................. 2011-272615

(51) Int. Cl.
*H04N 5/374* (2011.01)
*H04N 5/363* (2011.01)
*H04N 5/3745* (2011.01)

(52) U.S. Cl.
CPC ............. *H04N 5/3742* (2013.01); *H04N 5/363* (2013.01); *H04N 5/37457* (2013.01)

(58) Field of Classification Search
CPC . H04N 5/3742; H04N 5/37457; H04N 5/363; H04N 5/3745
USPC .................. 348/308, 241, 294, 301; 257/291; 250/208.1
See application file for complete search history.

(56) References Cited

U.S. PATENT DOCUMENTS

| 5,933,189 A | 8/1999 | Nomura |
| 8,436,927 B2 * | 5/2013 | Egawa .......................... 348/308 |

(Continued)

FOREIGN PATENT DOCUMENTS

| EP | 1 619 879 A2 | 1/2006 |
| JP | H07-283386 A | 10/1995 |

(Continued)

OTHER PUBLICATIONS

International Search Report dated Feb. 19, 2013 issued in PCT/JP2012/082141.

(Continued)

*Primary Examiner* — Nhan T Tran
(74) *Attorney, Agent, or Firm* — Scully, Scott, Murphy & Presser, PC

(57) ABSTRACT

Reset noise in pixels is removed. A solid-state imaging device includes pixels arranged in row and column directions, in which each of the pixels includes a charge-voltage conversion terminal for voltage-converting signal charges transferred from a photoelectric conversion element by a transfer means, and a first reset means for resetting a voltage at the charge-voltage conversion terminal; signal lines, each of which is connected to the pixels in each column; a scanning means for selecting one row among others; and constant current circuit elements for supplying constant current to the signal lines. In the device, within each selected row, each reset voltage at each charge-voltage conversion terminal and a converted voltage from transferred signal charges are read out to and stored in each signal line supplied with constant current by each constant current circuit element, and then output.

4 Claims, 16 Drawing Sheets

(56) References Cited

U.S. PATENT DOCUMENTS

| | | |
|---|---|---|
| 2003/0164887 A1 | 9/2003 | Koizumi et al. |
| 2005/0212937 A1* | 9/2005 | Koyama ........................ 348/301 |
| 2005/0225653 A1 | 10/2005 | Masuyama et al. |
| 2009/0268050 A1 | 10/2009 | Tashiro et al. |
| 2010/0097508 A1* | 4/2010 | Yanagita et al. .............. 348/301 |
| 2010/0182469 A1* | 7/2010 | Takamiya et al. ............. 348/294 |
| 2011/0234871 A1 | 9/2011 | Taruki et al. |
| 2012/0026370 A1* | 2/2012 | Oike et al. .................... 348/298 |
| 2013/0037696 A1* | 2/2013 | Iwata et al. ................ 250/208.1 |

FOREIGN PATENT DOCUMENTS

| | | |
|---|---|---|
| JP | H09-055887 A | 2/1997 |
| JP | 2005-303746 A | 10/2005 |
| JP | 2009-088539 A | 4/2009 |

OTHER PUBLICATIONS

Extended Supplementary European Search Report dated Jun. 29, 2015 from related European Application No. 12 85 8264.0.

* cited by examiner

SOLID-STATE IMAGING DEVICE

CROSS-REFERENCE TO RELATED APPLICATIONS

This application is a Continuation Application of International Application PCT/JP2012/082141 filed on Dec. 12, 2012, which claims priority to Japanese Application No. 2011-272615 filed on Dec. 13, 2011.

The Contents of International Application PCT/JP2012/082141 and Japanese application No. 2011-272615 are hereby incorporated by reference herein in its entirety.

TECHNICAL FIELD

The present invention relates to a solid-state imaging device.

BACKGROUND ART

It is conventionally known that some amplification-type solid-state imaging elements, as represented by complementary metal-oxide semiconductor (CMOS) image sensors, use a method of reading out capacity load, as is disclosed for example in Japanese Unexamined Patent Application, Publication No. Hei 7-283386 (hereinafter referred to as "JP Hei 7-283386"). The amplification-type solid-state imaging element converts signal charges accumulated in the photodiode to a signal voltage in each pixel and outputs the voltage to each signal line. According to JP Hei 7-283386, a signal voltage output from each pixel is temporarily held in a load capacity element connected to each signal line and then read out to a horizontal signal line.

CITATION LIST

Patent Literature

{PTL 1}
Japanese Unexamined Patent Application, Publication No. Hei 7-283386

SUMMARY OF INVENTION

Technical Problem

Unfortunately, JP Hei 7-283386 presents a configuration designed to output a voltage in response to signal charges accumulated in each pixel as-is to each vertical signal line and does not present a configuration that permits the complete transfer of signal charges accumulated in each pixel. Such a configuration does not allow the removal of reset noise left in each pixel, which is associated with a switch operation for initializing signal charges accumulated in each pixel to a reset voltage.

In view of the circumstances described above, an object of the present invention is to provide a solid-state imaging device capable of removing reset noise in pixels while the circuit configuration is kept in low power consumption.

Solution to Problem

In order to achieve the above-mentioned object, the present invention provides the following solutions.

An aspect of the present invention provides a solid-state imaging device including a plurality of pixels arranged in both row and column directions, in which each of the pixels includes a photoelectric conversion element for photoelectrically converting incident light so as to accumulate signal charges; a charge-voltage conversion terminal for voltage-converting signal charges accumulated in the photoelectric conversion element into voltage signals; a voltage signal output means for amplifying signals voltage-converted by the charge-voltage conversion terminal; a transfer means for transferring signal charges accumulated in the photoelectric conversion element to the charge-voltage conversion terminal; and a first reset means for switching between conduction and disconnection to a power source having a first reset voltage for the charge-voltage conversion terminal by on-off control. The solid-state imaging device further includes a plurality of first signal lines capable of being kept in a floating potential state, in which each of the first signal lines is connected in common to each of the pixels in each column; a first scanning means for selecting the pixels that output respective signals to the respective first signal lines via the voltage signal output means corresponding to each of the pixels; and constant current circuit elements for turning on and off the supply of constant current to the respective first signal lines. The solid-state imaging device executes a noise signal read-out operation in which each of the charge-voltage conversion terminals in the respective pixels in one row selected by the first scanning means is reset to the first reset voltage by turning on the first reset means and then rendered to be in a floating potential state by turning off the first reset means; with constant current being supplied to the first signal lines by turning on the constant current circuit elements, each voltage at each of the charge-voltage conversion terminals is read out to each of the first signal lines via each voltage signal output means for a predetermined period of time so that each voltage is stored in each of the first signal lines; and noise signals in the respective pixels in the one row are output by turning off the constant current circuit elements and reading out each voltage stored in each of the first signal lines. The solid-state imaging device also executes an optical signal read-out operation in which signal charges accumulated in each of the photoelectric conversion elements in the respective pixels in one row selected by the first scanning means are transferred to each of the charge-voltage conversion terminals by the transfer means; with constant current being supplied to the first signal lines by turning on the constant current circuit elements, each signal voltage-converted by each of the charge-voltage conversion terminals is read out to each of the first signal lines via each voltage signal output means for the predetermined period of time so that each voltage signal is stored in each of the first signal lines; and optical signals in the respective pixels in the one row are output by turning off the constant current circuit elements and reading out each voltage stored in each of the first signal lines.

DESCRIPTION OF EMBODIMENTS

A solid-state imaging device 1 in accordance with an embodiment of the present invention will now be described with reference to the attached drawings.

Figure 1:
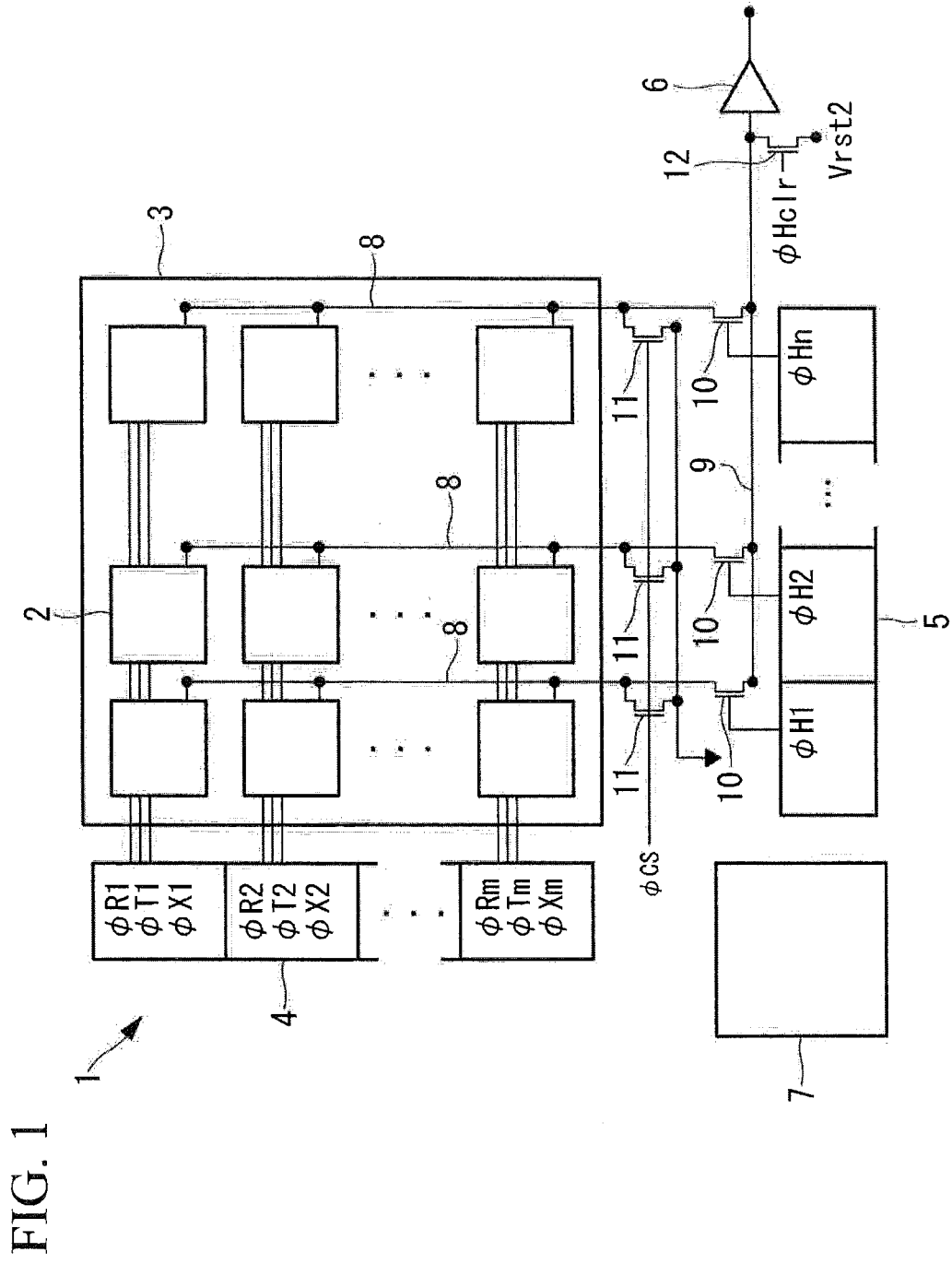
FIG. 1 is a plane view illustrating a configuration of a solid-state imaging device in accordance with an embodiment of the present invention.

With reference to FIG. 1, a basic configuration of the solid-state imaging device 1 according to the embodiment includes a pixel array 3 composed of a plurality of pixels 2, a vertical shift register 4, a horizontal shift register 5, a final output amplifier circuit 6 and a control circuit 7. Around these components, an analog-to-digital (A/D) converter circuit, a signal processing circuit, and the like (not shown) are provided.

The pixel array 3 is composed of a plurality of pixels 2 arranged in a row direction and a column direction. The pixels 2 in a single column are connected in common to one of vertical signal lines 8 and the vertical signal lines 8 are connected to a common horizontal signal line 9 via respective column selection transistors 10.

Load transistors (constant current circuit elements) 11 are connected between the respective vertical signal lines 8 and a ground voltage and supplies a constant current to the respective vertical signal lines 8. A transistor 12 (a second reset transistor) for resetting horizontal signal line is connected to the horizontal signal line 9 and resets the horizontal signal line 9 to a second reset voltage Vrst2. The transistors 11, 12 are driven by receiving respective pulses φCS, φHclr from a pulse circuit (not shown) at their respective gates.

The vertical shift register 4 selects one row from the pixel array 3 and inputs pulses φRj, φTj, φXj described later into the pixels 2 in the selected single row so as to cause the pixels 2 to output signals to the respective vertical signal lines 8.

The horizontal shift register 5 inputs each of column selection pulses φH {φH1, φH2, . . . , φHn} in order from the first column to the gate of each column selection transistor 10 aligned along the horizontal signal line 9 so as to cause the vertical signal lines 8 each in order from the first column to output signals to the horizontal signal line 9.

The final output amplifier circuit 6 amplifies signals from the horizontal signal line 9 to output them. Signals output from the final output amplifier circuit 6 are input into the A/D converter circuit (not shown), converted to digital signals and then processed by the signal processing circuit (not shown) for imaging.

According to a preset pulse sequence, the control circuit 7 outputs control signals that permit the output of each pulse described above to the shift registers 4, 5 and the pulse circuit so as to control the operation of reading signals from the pixel array 3.

Figure 2:
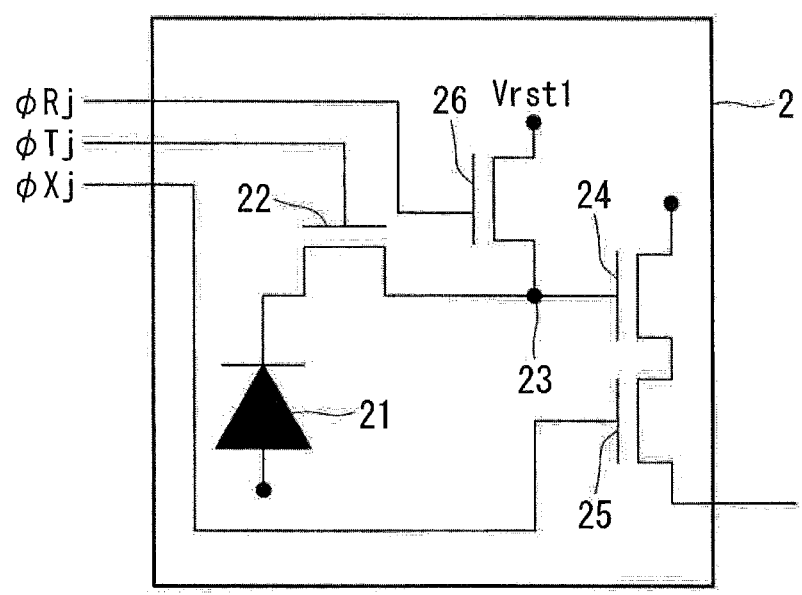
FIG. 2 is a plane view illustrating a configuration of a pixel included in the solid-state imaging device of FIG. 1.

With reference to FIG. 2, a circuit configuration of each pixel 2 will now be described. The pixel 2, as shown in FIG. 2, includes a photodiode (PD, a photoelectric conversion element) 21 that photoelectrically converts received optical signals so as to accumulate signal charges; a transfer transistor (a transfer means) 22 that transfers signal charges accumulated in the PD 21; floating diffusion (FD, a charge-voltage conversion terminal) 23 that accumulates signal charges transferred by the transfer transistor 22; an amplifier transistor (a voltage signal output means) 24 that reads out signal charges accumulated in the FD 23 as a voltage; a pixel selection transistor 25 connected between the amplifier transistor 24 and the vertical signal line 8; and an FD reset transistor (a first reset means) 26 that resets a voltage at the FD 23 to a first reset voltage Vrst1.

The gates of the transfer transistor 22, the pixel selection transistor 25 and the FD reset transistor 26 are connected to the vertical shift register 4, and each pixel 2 is driven by receiving pulses from the vertical shift register 4 at the respective gates.

To be concrete, the transfer transistor 22 receives a transfer pulse φTj at its gate to transfer signal charges accumulated by the PD 21 on the source side to the FD 23 on the drain side. This transfer operation resets the amount of signal charges accumulated in the PD 21 to zero. The FD 23 accumulates signal charges transferred from the PD 21 through the transfer transistor 22 and generates a signal voltage in relation to an amount of the accumulated signal charges.

The amplifier transistor 24 amplifies the signal voltage at the FD 23 connected to its gate and outputs a signal of the amplified voltage to the pixel selection transistor 25 on the source side. The pixel selection transistor 25 receives a pixel selection pulse φXj from the vertical shift register 4 at its gate so as to output the signal input from the amplifier transistor 24 to the vertical signal line 8. The FD reset transistor 26 receives an FD reset pulse φRj from the vertical shift register 4 at its gate so that the signal charges accumulated in the FD 23 are discharged to the drain side of the FD reset transistor 26. This resets the voltage at the FD 23 to the first reset voltage Vrst1.

Figure 3:
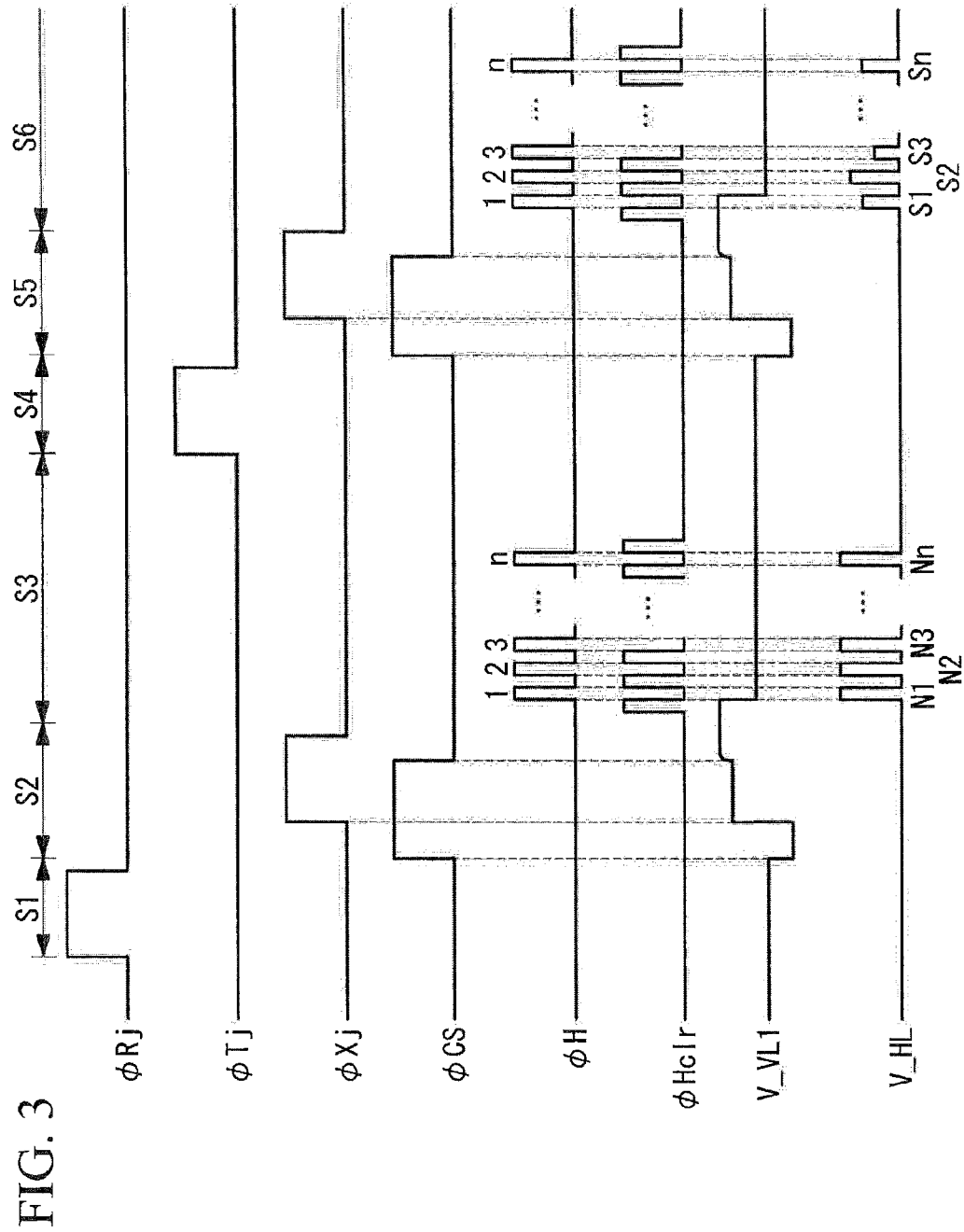
FIG. 3 is a timing chart illustrating an operation conducted by the solid-state imaging device of FIG. 1.

With reference to the timing chart of FIG. 3, a method of driving the solid-state imaging device 1 having such a configuration will now be described.

The method of driving the solid-state imaging device 1 according to the embodiment involves an optical signal read-out operation for reading out optical signals received by each pixel 2 and a noise signal read-out operation conducted prior to the optical signal read-out operation.

Specifically, the noise signal read-out operation includes a first process S1 for resetting each FD 23, a second process S2 for reading out a voltage at each of the FDs 23 after reset to the respective vertical signal lines 8 where the respective read-out signals are stored, and a third process S3 for reading out the signals stored in the respective vertical signal lines 8 in orderly sequence to the horizontal signal line 9 and outputting them from the final output amplifier circuit 6.

In the initial state, the transistors 10, 11, 12, 22, 25 and 26 are in an off-state in which no pulses are input to their gates, and the FD 23, the vertical signal lines 8 and the horizontal signal line 9 are in a floating potential state.

In the first process S1, an FD reset pulse φR1 is applied from the vertical shift register 4 to each of the pixels 2 in the first row so that the voltage at the FD 23 in each of the pixels 2 is reset to the first reset voltage Vrst1. In the operation of resetting the FD 23, both of the first reset voltage Vrst1 and a reset noise involved in the operation of turning on and off the FD reset transistor 26 are stored in each FD 23.

Next, in the second process S2, the pulse circuit applies the switch pulse φCS to each load transistor 11 so that a voltage V_VLi at each vertical signal line 8 is reset to the ground voltage. FIG. 3 shows only a voltage V_VL1 for the first column on behalf of n pieces of vertical signal lines 8.

Following the reset of the vertical signal lines 8, the vertical shift register 4 applies a pixel selection pulse φX1 to each of the pixels 2 in the first row with the load transistors 11 kept in on-state. This means that a voltage signal at the FD 23 in each pixel 2 is read out to each of the vertical signal lines 8 via the amplifier transistor 24 and the pixel selection transistor 25. After that, the load transistors 11 and the pixel selection transistors 25 become in off-state and the vertical signal lines 8 are rendered again to be in a floating potential state so that the signal read out to each of the vertical signal lines 8 is stored in each of the vertical signal lines 8.

Next, in the third process S3, the horizontal shift register 5 applies the column selection pulses φH1, φH2, . . . , φHn in order from the first column to the respective column selection transistors 10. This reads out signals N1, N2, . . . , Nn stored in the respective vertical signal lines 8 to the horizontal signal line 9 in order from the first column to the Nth column. The signals N1, N2, . . . , Nn read out to the horizontal signal line 9 are output via the final output amplifier circuit 6 to the outside. At this time, each of the column selection pulses φHi (i=1, 2, . . . , n) and the reset pulse φHclr for horizontal signal line are alternately output so that a voltage V_HL at the horizontal signal line 9 is reset to the second reset voltage Vrst2 every time one signal Ni is output from the final output amplifier circuit 6.

Each of the signals N1, N2, . . . , Nn output from the final output amplifier circuit 6 in this manner includes the first reset voltage Vrst1 and the reset noise involved in the operation of resetting each FD 23.

The optical signal read-out operation is executed following the noise signal read-out operation described so far.

The optical signal read-out operation includes a fourth process S4 for transferring signal charges accumulated in each PD 21 to each FD 23, a fifth process S5 for reading out a voltage signal at each FD 23, after the transfer of the signal charges, to the respective vertical signal lines 8 where the respective read-out signals are stored, and a sixth process S6 for reading out the signals stored in the respective vertical signal lines 8 in orderly sequence to the horizontal signal line 9 and outputting them from the final output amplifier circuit 6.

In the fourth process S4, the vertical shift register 4 applies a transfer pulse φT1 to each of the pixels 2 in the first row so that signal charges that have been accumulated in the PD 21 is transferred to the FD 23 through the transfer transistor 22. This changes a voltage at each FD 23, that is the voltage after the reset operation in the first process S1, by an amount of a signal voltage in relation to an amount of the signal charges.

In like manner with the second process S2 described above, in the fifth process S5, the pulse circuit applies the switch pulse φCS to each load transistor 11 and then the vertical shift register 4 applies the pixel selection pulse φX1 to each of the pixels 2 in the first row. This means that a voltage signal at the FD 23 in each pixel 2 is read out to each of the vertical signal lines 8 via the amplifier transistor 24 and the pixel selection transistor 25. After that, the load transistors 11 and the pixel selection transistors 25 become in off-state and the vertical signal lines 8 are rendered again to be in a floating potential state so that the signal read out to each of the vertical signal lines 8 is stored in each of the vertical signal lines 8.

In like manner with the third process S3 described above, in the sixth process S6, the horizontal shift register 5 applies the column selection pulses φH1, φH2, . . . , φHn to the respective column selection transistors 10. This causes signals S1, S2, . . . , Sn stored in the respective vertical signal lines 8 to be read out in order from the first column to the horizontal signal line 9 and output via the final output amplifier circuit 6 to the outside.

Each of the signals S1, S2, . . . , Sn output from the final output amplifier circuit 6 in this manner represents the superimposition of a signal equivalent to an amount of optical signals received by each PD 21 over each of the signals N1, N2, . . . , Nn read out by the noise signal read-out operation.

After executing the noise signal read-out operation and the optical signal read-out operation on the pixels 2 in the first row as described above, the control circuit 7 controls the vertical shift register 4 to select the pixels 2 in the second row so as to execute the noise signal read-out operation and the optical signal read-out operation on them in like manner with the first row. Then, the control circuit 7 controls the vertical shift register 4 to advance the row to be selected one by one to execute the noise signal read-out operation and the optical signal read-out operation in all the rows so that signals on all the pixels 2 are read out.

The solid-state imaging device 1 according to the embodiment, as described above, processes two types of signals output from the final output amplifier circuit 6 in the signal processing circuit. In other words, the signal processing circuit subtracts each signal Ni output by the noise signal read-out operation from each signal Si output by the optical signal read-out operation to get the difference as a net signal for the subject pixel 2. This allows the acquisition of a net signal after a subtraction of the reset noise at each FD 23 based on the signal voltage at each PD 21.

Moreover, an analog memory like a capacitor for storing signals read from each pixel 2 is not needed because voltage signals read from the FDs 23 to the vertical signal lines 8 are temporarily stored in the vertical signal lines 8. This allows downsizing to be planned. Particularly, in conventional solid-state imaging devices, the analog memory takes up a relatively large area, thus the omission of an analog memory brings the advantage of downsizing the solid-state imaging device 1 as a whole. Reading signals from the FDs 23 to the vertical signal lines 8 with constant current being fed to the vertical signal lines 8 allows signals to be read out with stability.

In the embodiment, the noise signal read-out operation and the optical signal read-out operation are alternately executed, i.e. the noise signal read-out operation and the optical signal read-out operation are successively executed in each row. Instead of this manner, another manner in which the noise signal read-out operation is first executed in all the rows and then the optical signal read-out operation is executed in all the rows may be adopted.

Figure 4:
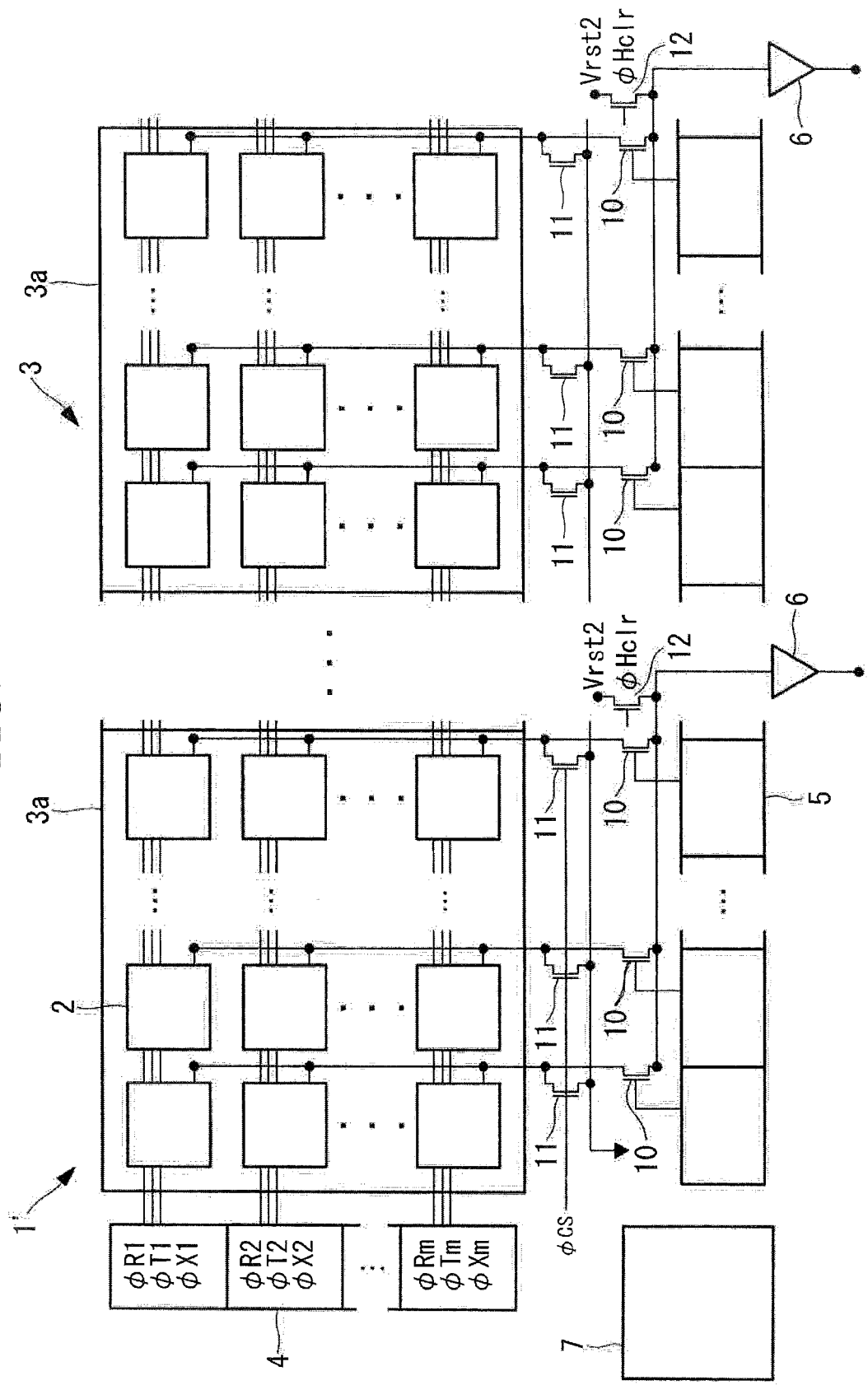
FIG. 4 is a plane view illustrating a variation of an array of pixels in the solid-state imaging device of FIG. 1.

Also, in the embodiment, all the vertical signal lines 8 are connected to the single horizontal signal line 9, and signals on all the pixels 2 are output via the common horizontal signal line 9 and the final output amplifier circuit 6. Instead of this, as shown in FIG. 4, another configuration in which the pixel array 3 is divided into a plurality of regions 3a in a row direction and each region 3a includes a horizontal signal line 9, a reset transistor 12 for horizontal signal line, and a final output amplifier circuit 6 may be adopted.

This configuration allows signals to be concurrently read from the pixels 2 in individual regions 3a, leading to reduced time required for reading out signals from all the pixels 2.

Figure 5:
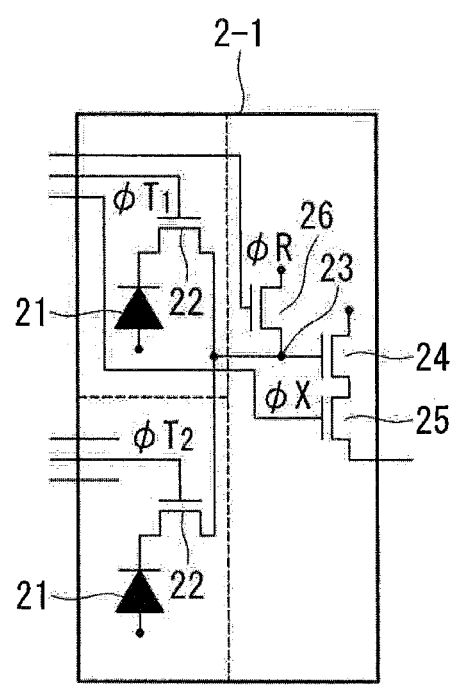
FIG. 5 is a plane view of a variation of the pixel in FIG. 2, illustrating a configuration of a pixel in a two-shared pixel form.
Figure 6:
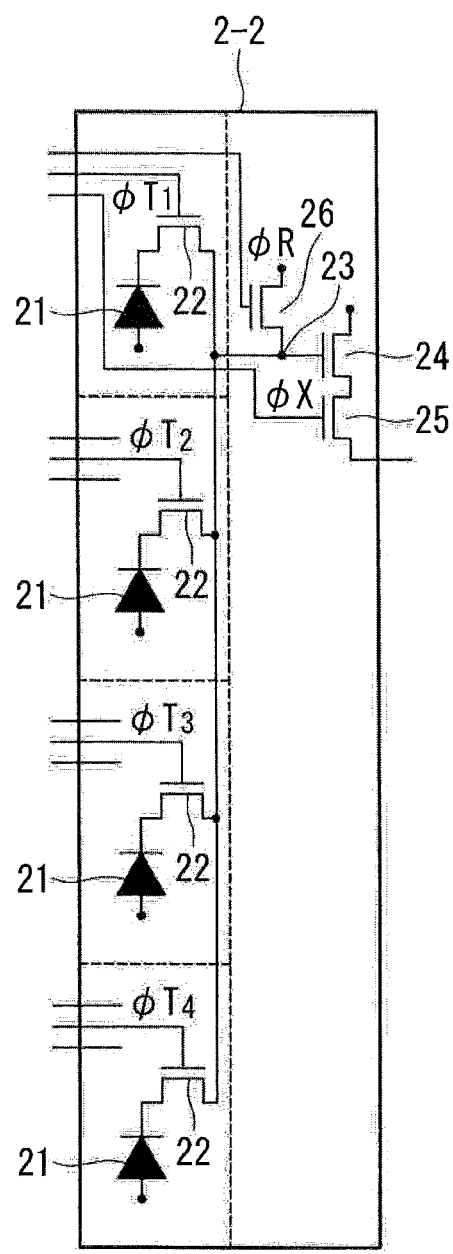
FIG. 6 is a plane view of a variation of the pixel in FIG. 2, illustrating a configuration of a pixel in a four-shared pixel form.
Figure 7:
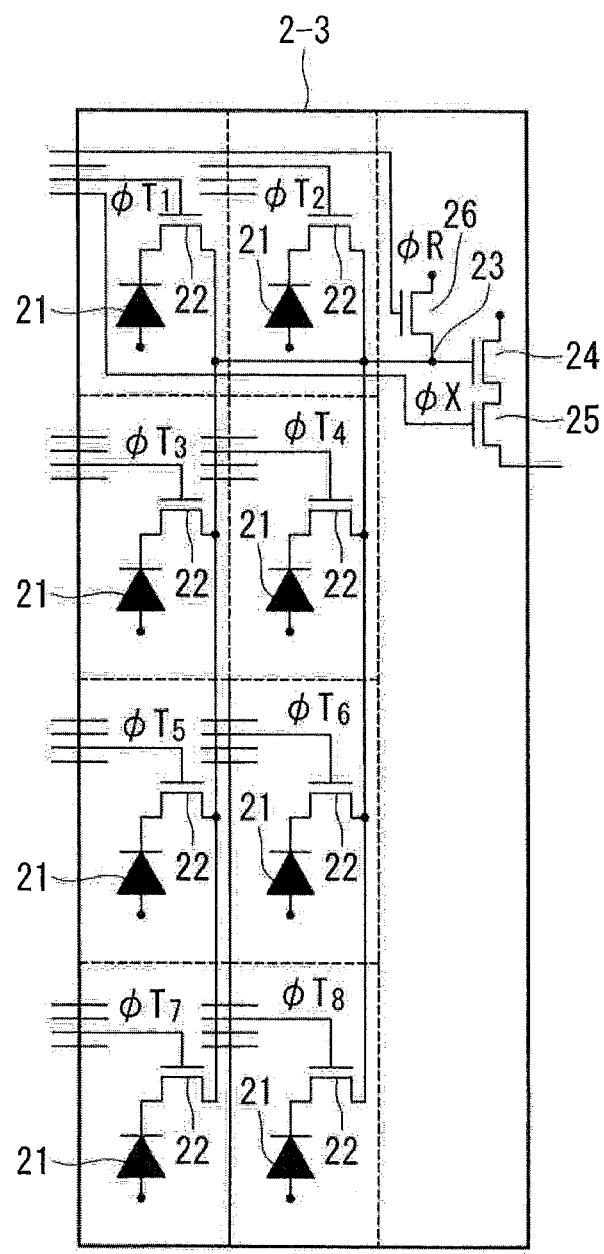
FIG. 7 is a plane view of a variation of the pixel in FIG. 2, illustrating a configuration of a pixel in an eight-shared pixel form.

The embodiment may be altered in configuration, as shown in FIGS. 5 to 7, in which each of pixels 2-1, 2-2 and 2-3 includes a plurality of PDs 21 and transfer transistors 22 and a plurality of the PDs 21 and the transfer transistors 22 are connected to a common FD 23 in parallel. The pixels 2-1, 2-2 and 2-3 shown in FIGS. 5, 6 and 7, respectively, include two, four and eight pieces of PDs 21 and transfer transistors 22, respectively. In this way, a plurality of the PDs 21 share an amplifier transistor 24, a pixel selection transistor 25 and an FD reset transistor 26 so that the area of the pixel array 3 can be reduced.

Figure 8:
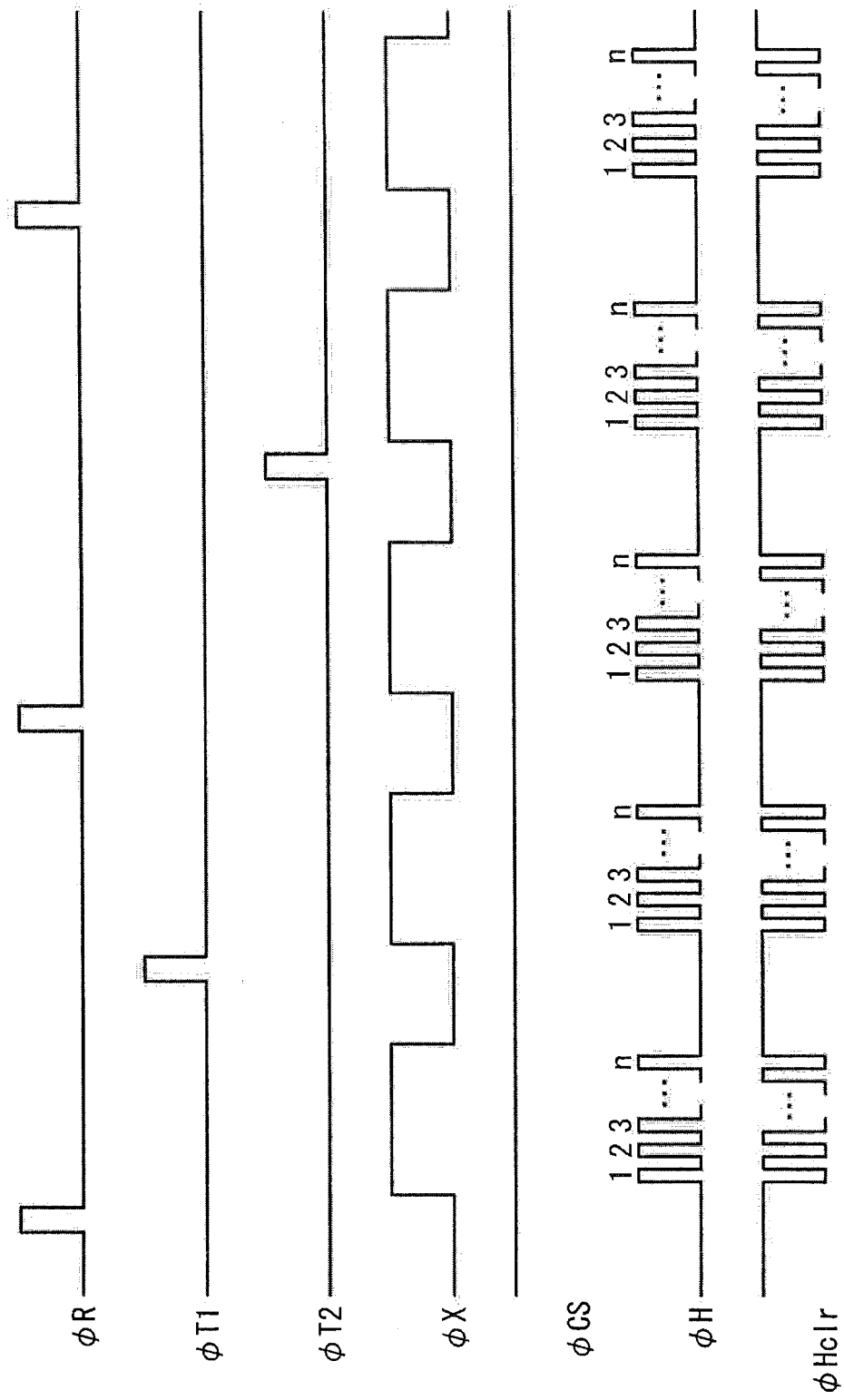
FIG. 8 is a timing chart illustrating an operation by a solid-state imaging device including the pixel of FIG. 5.
Figure 9:
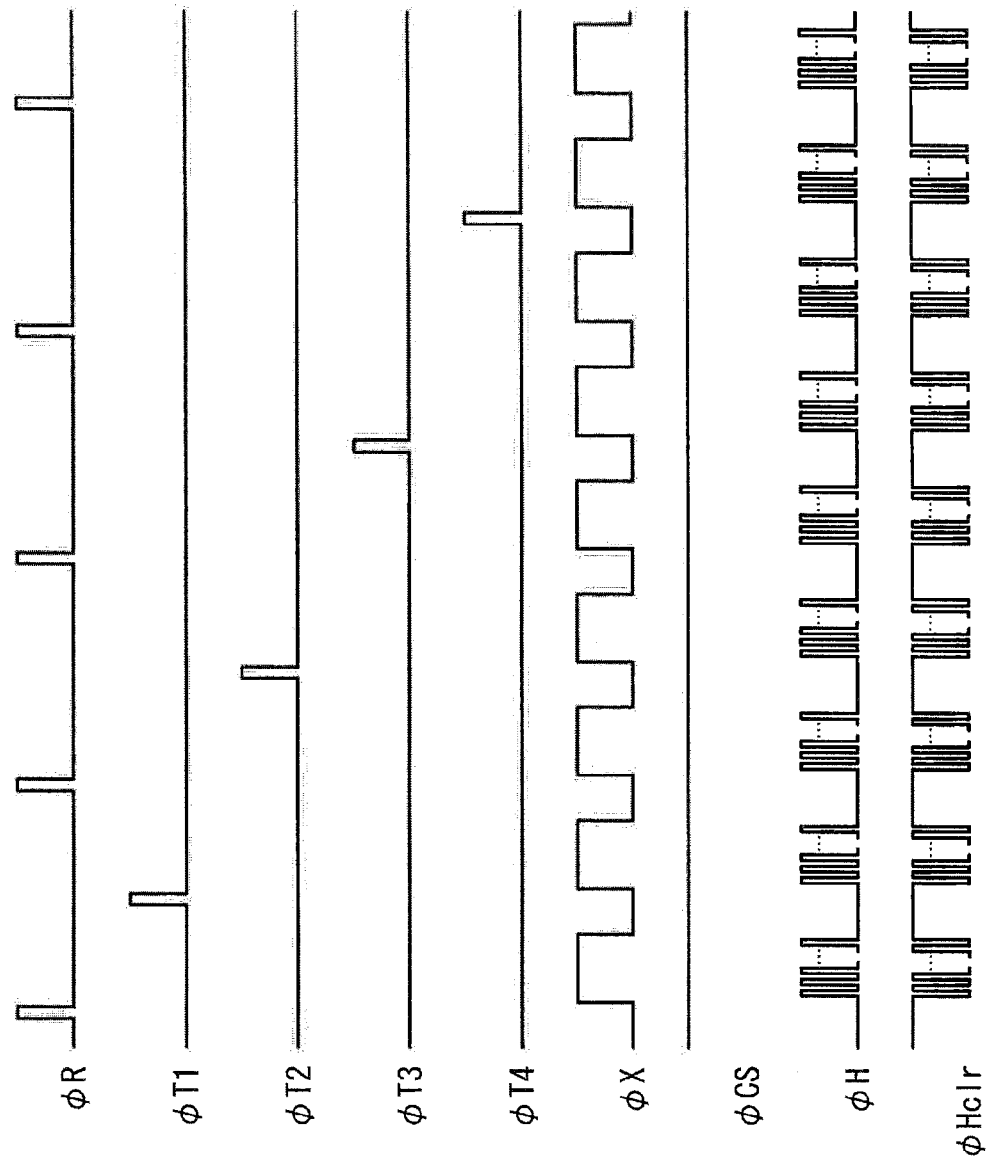
FIG. 9 is a timing chart illustrating an operation by a solid-state imaging device including the pixel of FIG. 6.
Figure 10:
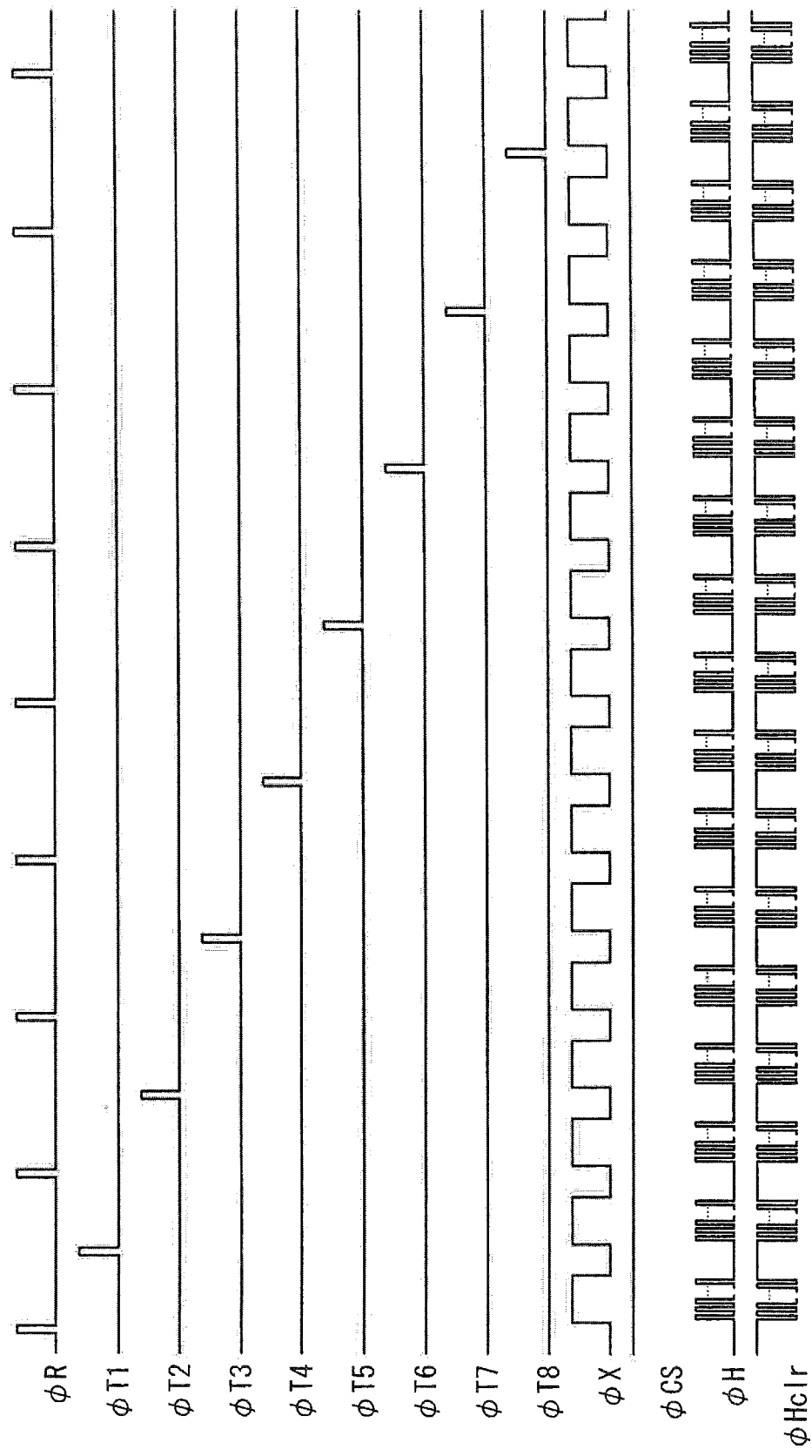
FIG. 10 is a timing chart illustrating an operation by a solid-state imaging device including the pixel of FIG. 7.

FIGS. 8 to 10 show respective operations by individual solid-state imaging devices including the pixels 2-1 to 2-3, respectively, configured as in FIGS. 5 to 7, respectively. In the case of a two-shared pixel form, as shown in FIG. 8, the vertical shift register 4 executes a noise read-out operation and a signal read-out operation on one PD 21 and then executes the noise read-out operation and the signal read-out operation on the other PD 21. Likewise, in the cases of a four-shared pixel form and an eight-shared pixel form, the noise read-out operation and the signal read-out operation are executed on respective PDs 21 in order, included in single pixels 2-2 and 2, 3, respectively.

Figure 11:
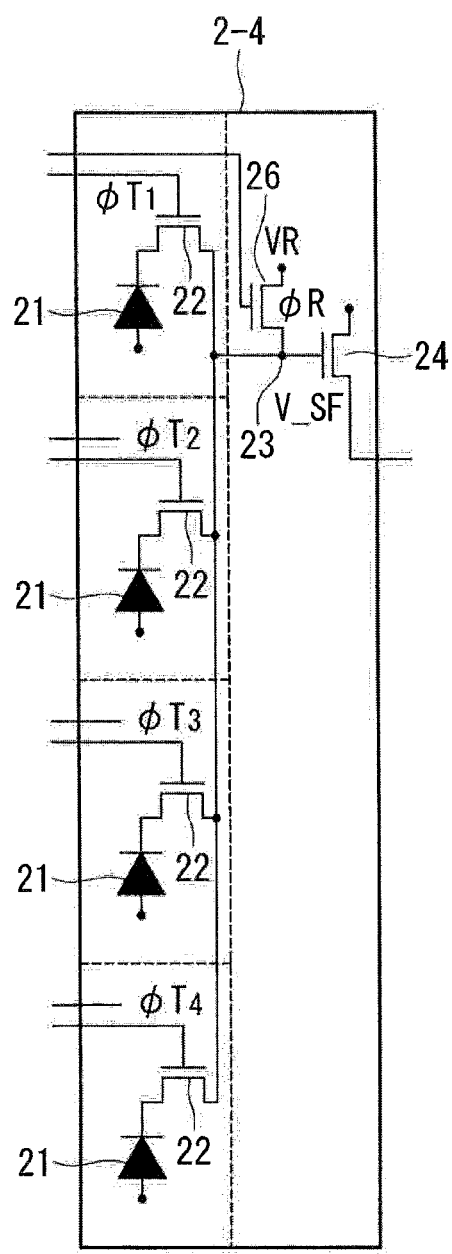
FIG. 11 is a plane view illustrating a variation of the pixel of FIG. 6.
Figure 12:
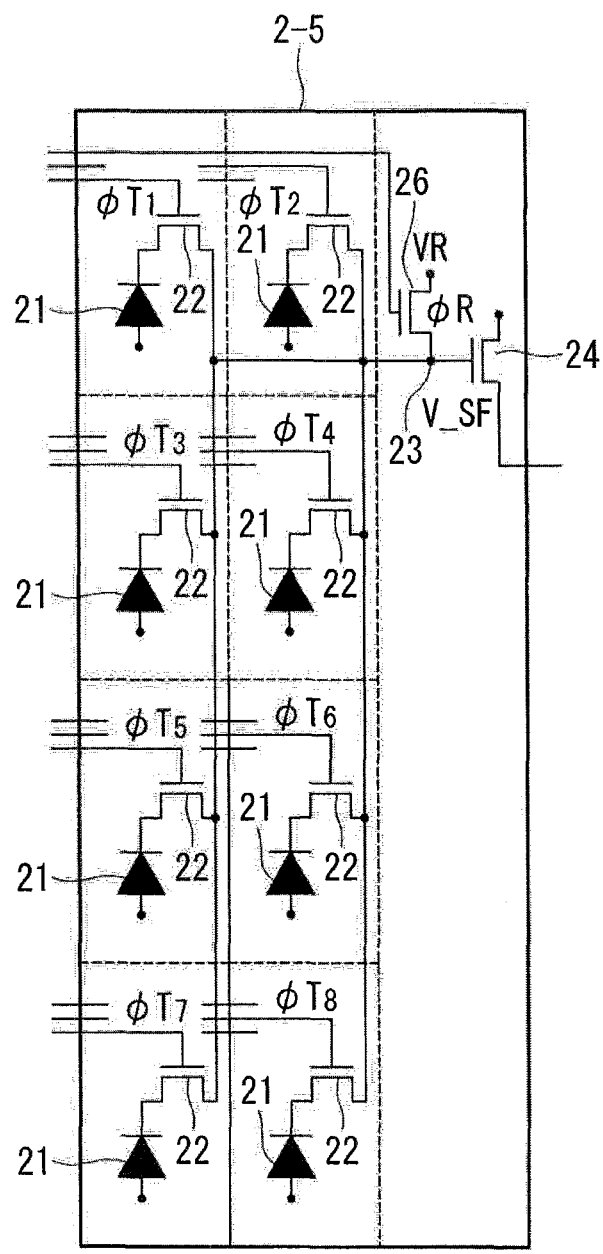
FIG. 12 is a plane view illustrating a variation of the pixel of FIG. 7.
Figure 13:
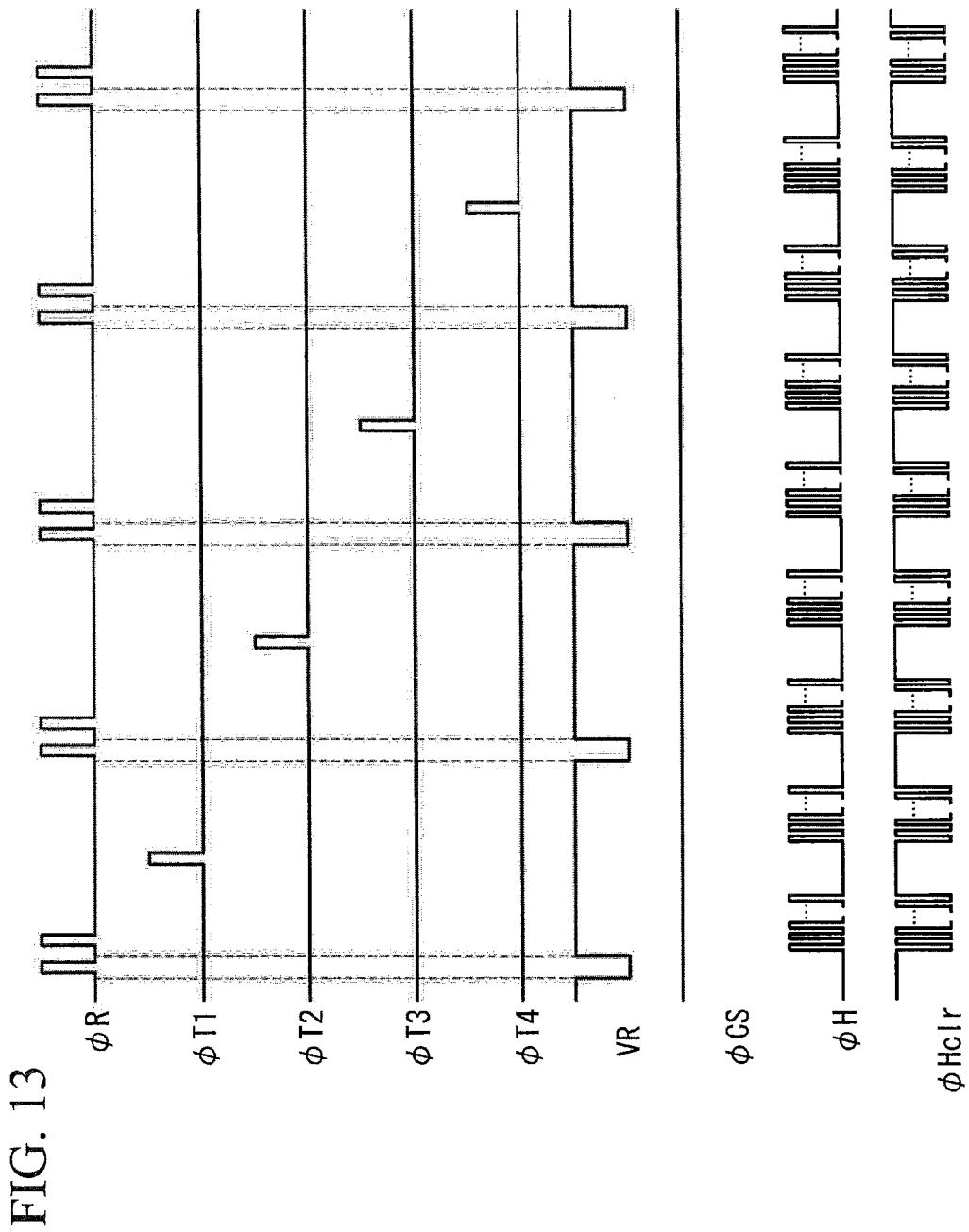
FIG. 13 is a timing chart illustrating an operation by a solid-state imaging device including the pixel of FIG. 11.
Figure 14:
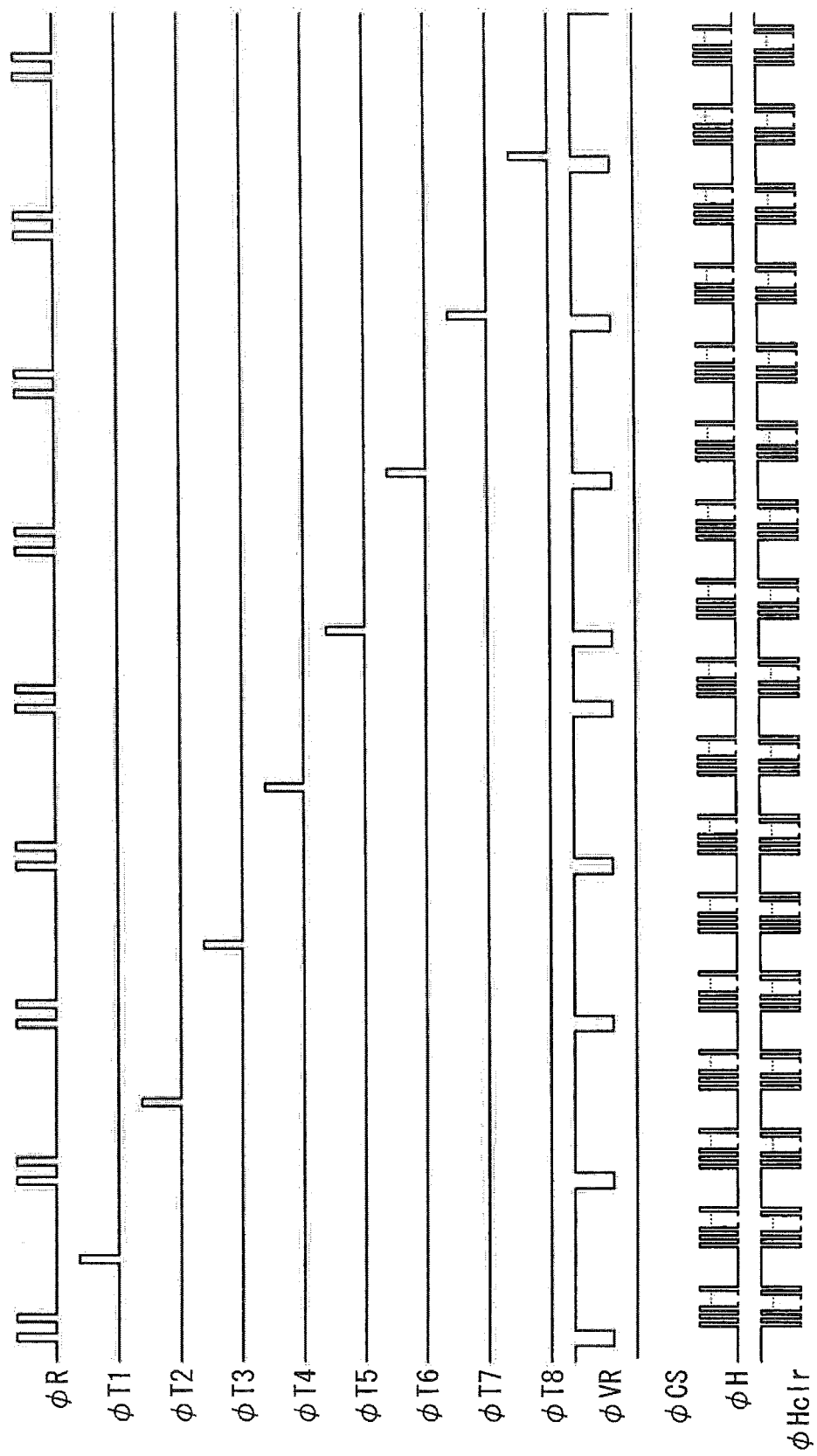
FIG. 14 is a timing chart illustrating an operation by a solid-state imaging device including the pixel of FIG. 12.

FIGS. 11 and 12 illustrate variations of the pixel 2-2 of FIG. 6 in a four-shared pixel form and the pixel 2-3 of FIG. 7 in an eight-shared pixel form, respectively. In these variations, the pixel selection transistor 25 is omitted and the FD reset transistor 26 also serves as the function of the pixel selection transistor 25. Specifically, as shown in FIGS. 13 and 14, the voltage VR at the drain of the FD reset transistor 26 switches between the first reset voltage Vrst1 and a sufficiently small voltage so that the reading-out of signals from the FD 23 to the vertical signal line 8 is turned on and off.

To be more specific, with the voltage VR at the drain of the FD reset transistor 26 switched to the first reset voltage Vrst1, the FD reset pulse φR is applied to the gate of the FD reset transistor 26 so that a signal is output from the FD 23 to the vertical signal line 8. On the other hand, with the voltage VR at the drain of the FD reset transistor 26 switched to a sufficiently small voltage, the FD reset pulse φR is applied to the gate of the FD reset transistor 26 so that the FD 23 is rendered to be at low potential and unable to output a signal to the vertical signal line 8.

Such variations enable the number of transistors to be further decreased and the area of the pixel array 3 to be further reduced.

Figure 15:
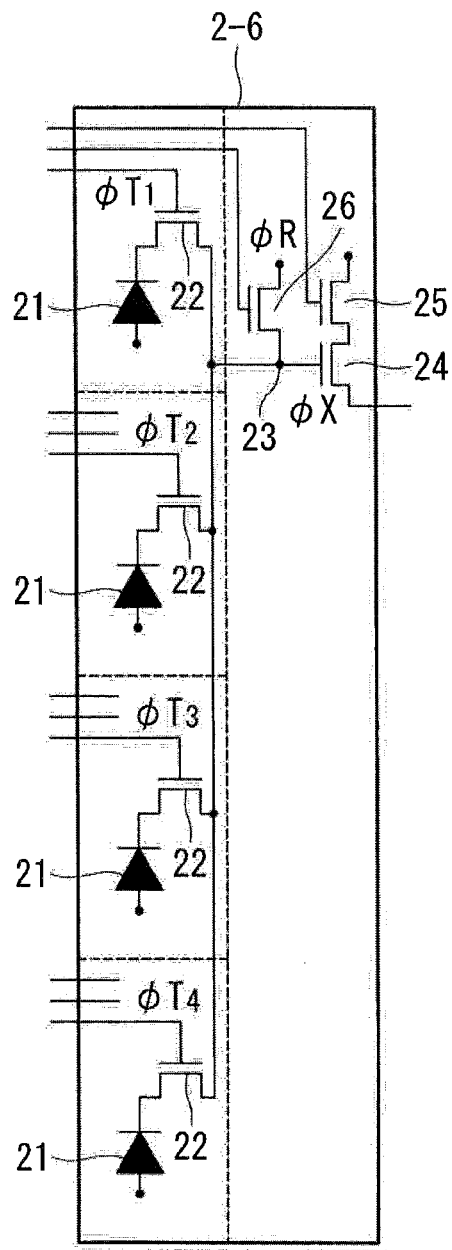
FIG. 15 is a plane view illustrating another variation of the pixel of FIG. 6.
Figure 16:
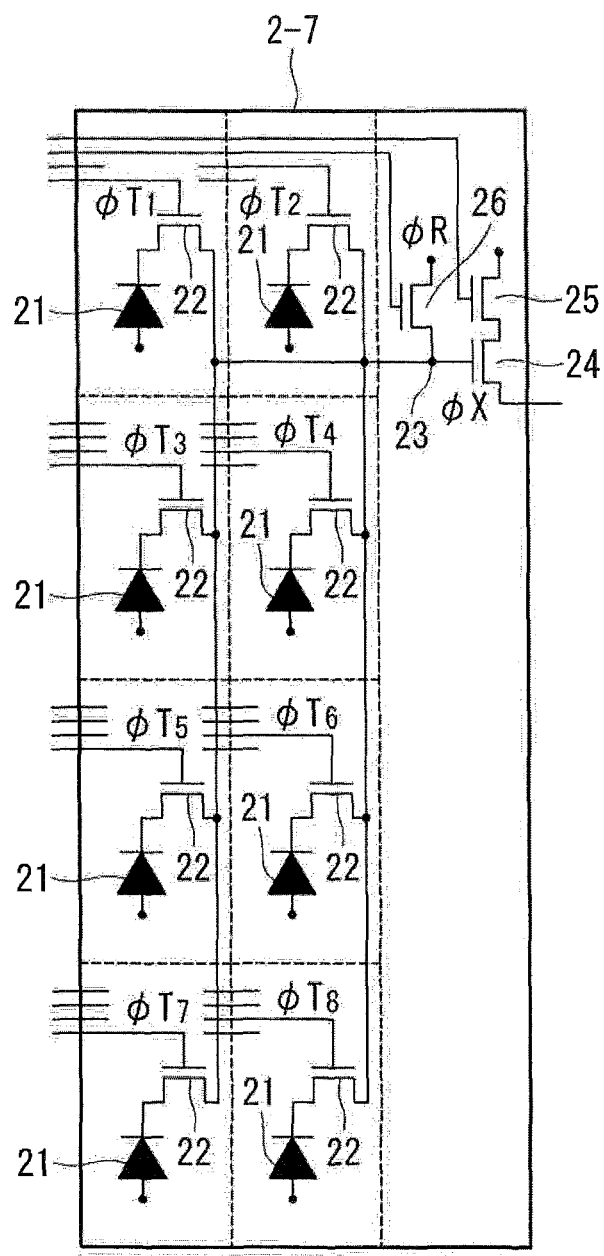
FIG. 16 is a plane view illustrating another variation of the pixel of FIG. 7.

FIGS. 15 and 16 illustrate other variations of the pixel 2-4 of FIG. 6 in a four-shared pixel form and the pixel 2-5 of FIG. 7 in an eight-shared pixel form, respectively. In these variations, the amplifier transistor 24 and the pixel selection transistor 25 are inversely disposed. The amplifier transistor 24 is disposed on the vertical signal line 8 side while the pixel selection transistor 25 is disposed on the power voltage side.

Such variations permit the gate-source capacitance of the amplifier transistor 24 to further increase voltage feedback when a signal is read from the pixel, which produces further increased signal voltage, leading to effectively enhanced sensitivity.

On the basis of the embodiment described above, inventions as follows are derived.

In order to achieve the above-mentioned object, the present invention provides the following solutions.

An aspect of the present invention provides a solid-state imaging device including a plurality of pixels arranged in both row and column directions, in which each of the pixels includes a photoelectric conversion element for photoelectrically converting incident light so as to accumulate signal charges; a charge-voltage conversion terminal for voltage-converting signal charges accumulated in the photoelectric conversion element into voltage signals; a voltage signal output means for amplifying signals voltage-converted by the charge-voltage conversion terminal; a transfer means for transferring signal charges accumulated in the photoelectric conversion element to the charge-voltage conversion terminal; and a first reset means for switching between conduction and disconnection to a power source having a first reset voltage for the charge-voltage conversion terminal by on-off control. The solid-state imaging device further includes a plurality of first signal lines capable of being kept in a floating potential state, in which each of the first signal lines is connected in common to each of the pixels in each column; a first scanning means for selecting the pixels that output respective signals to the respective first signal lines via the voltage signal output means corresponding to each of the pixels; and constant current circuit elements for turning on and off the supply of constant current to the respective first signal lines. The solid-state imaging device executes a noise signal read-out operation in which each of the charge-voltage conversion terminals in the respective pixels in one row selected by the first scanning means is reset to the first reset voltage by turning on the first reset means and then rendered to be in a floating potential state by turning off the first reset means; with constant current being supplied to the first signal lines by turning on the constant current circuit elements, each voltage at each of the charge-voltage conversion terminals is read out to each of the first signal lines via each voltage signal output means for a predetermined period of time so that each voltage is stored in each of the first signal lines; and noise signals in the respective pixels in the one row are output by turning off the constant current circuit elements and reading out each voltage stored in each of the first signal lines. The solid-state imaging device also executes an optical signal read-out operation in which signal charges accumulated in each of the photoelectric conversion elements in the respective pixels in one row selected by the first scanning means are transferred to each of the charge-voltage conversion terminals by the transfer means; with constant current being supplied to the first signal lines by turning on the constant current circuit elements, each signal voltage-converted by each of the charge-voltage conversion terminals is read out to each of the first signal lines via each voltage signal output means for the predetermined period of time so that each voltage signal is stored in each of the first signal lines; and optical signals in the respective pixels in the one row are output by turning off the constant current circuit elements and reading out each voltage stored in each of the first signal lines.

According to the aspect of the present invention, the photoelectric conversion element converts incident light to signal charges and accumulates them. Then, the transfer means transfers the signal charges to the charge-voltage conversion terminal that converts them to voltage signals. The voltage signal amplification means amplifies the voltage signals and outputs them to the corresponding first signal line in a floating potential state, where the voltage signals are temporarily stored in the respective first signal lines. After that, the voltage signals are read from each of the first signal lines so that optical signals are obtained from respective pixels in one line selected by the first scanning means.

Prior to the reading out of optical signals described above, the following operation is carried out. Each of the charge-voltage conversion terminals is reset to the first reset voltage by the first reset means. Then, voltage signals at the respective charge-voltage conversion terminals after reset are read out to the respective first signal lines where constant current is supplied from the respective constant current circuit elements so that the voltage signals are temporarily stored in the respective first signal lines and then read from the first signal lines. This means that signals at respective charge-voltage conversion terminals, after reset, in respective pixels in one line have been read out. After the operation, the reading out of optical signals described above is executed.

Signals in the respective pixels read out by the noise signal read-out operation and signals in the respective pixels read out by the optical signal read-out operation have reset noise in common involved in resetting the charge-voltage conversion terminals. Determining a difference between the two types of signals allows the acquisition of a net optical signal for each pixel after the removal of reset noise.

According to the aspect of the present invention, the noise signal read-out operation for outputting noise signals from respective pixels in the one row and the optical signal read-out operation for outputting optical signals from respective pixels in the one row may be alternately repeated while the first scanning means changes its selection for the pixels in the column direction.

Executing the noise signal read-out operation and the optical signal read-out operation in succession on each pixel in this manner minimizes the time between reading out a voltage at the charge-voltage conversion terminal after reset and reading out a signal after the transfer of signal charges. This prevents noise due to other factors from being added to the charge-voltage conversion terminal during this time, enabling the acquisition of a more precise optical signal.

A solid-state imaging device according to the aspect of the present invention may further include a plurality of second signal lines, in which each of the second signal lines is connected to a plurality of the first signal lines; a plurality of second reset means for resetting a voltage at each of the second signal lines; a plurality of signal amplification means for causing each of the second signal lines to output signals; and a second scanning means for selecting one among the first signal lines connected to each of the second signal lines so as to cause the selected first signal line to output signals to the corresponding second signal line. The noise signal read-out operation for outputting noise signals from respective pixels in the one row and the optical signal read-out operation for outputting optical signals from respective pixels in the one row may be alternately and repeatedly executed on pixels corresponding to a plurality of the first signal lines connected to each of the second signal lines while each of a plurality of the second reset means is resetting a voltage at each of the second signal lines.

Dividing the entire pixel array into a plurality of groups in the unit of columns in this manner and concurrently reading signals from the pixels in each of the groups permit the time required for reading out signals from all the pixels to be shortened.

According to the aspect of the present invention, each of the pixels may include at least two of the photoelectric conversion elements, the transfer means of the same number as the photoelectric conversion elements, and a single of the charge-voltage conversion terminal connected in parallel to the photoelectric conversion elements and the transfer means. The optical signal read-out operation may read optical signals from one of the photoelectric conversion elements in each of the pixels in one row selected by the first scanning means.

In this manner, a plurality of photoelectric conversion terminals share a part of the configuration so that an area taken up by the pixels can be reduced.

Advantageous Effects of Invention

The present invention provides an effect of removing reset noise in pixels.

REFERENCE SIGNS LIST 1 solid-state imaging device
2, 2-1 to 2-7 pixel
3 pixel array
4 vertical shift register (first scanning means)
5 horizontal shift register (second scanning means)
6 final output amplifier circuit
7 control circuit
8 vertical signal line (first signal line)
9 horizontal signal line (second signal line)
10 column selection transistor
11 load transistor (constant current circuit element)
12 reset transistor for horizontal signal line (second reset transistor)
21 photodiode (photoelectric conversion element)
22 transfer transistor (transfer means)
23 floating diffusion (charge-voltage conversion terminal)
24 amplifier transistor (voltage signal output means)
25 pixel selection transistor
26 floating diffusion reset transistor (first reset means)

The invention claimed is:

1. A solid-state imaging device comprising:
a plurality of pixels arranged in both row and column directions, each of the pixels comprising:
a photoelectric conversion element for photoelectrically converting incident light so as to accumulate signal charges; a charge-voltage conversion terminal for voltage-converting signal charges accumulated in the photoelectric conversion element into voltage signals; a voltage signal output means for amplifying signals voltage-converted by the charge-voltage conversion terminal; a transfer means for transferring signal charges accumulated in the photoelectric conversion element to the charge-voltage conversion terminal; and a first reset means for switching between conduction and disconnection to a power source having a first reset voltage for the charge-voltage conversion terminal by on-off control;
a plurality of first signal lines capable of being kept in a floating potential state, each of the first signal lines being connected in common to each of the pixels in each column;
a first scanning means for selecting the pixels that output respective signals to the respective first signal lines via the voltage signal output means corresponding to each of the pixels; and
constant current circuit elements for turning on and off the supply of constant current to the respective first signal lines,
wherein the solid-state imaging device executes a noise signal read-out operation in which each of the charge-voltage conversion terminals in the respective pixels in one row selected by the first scanning means is reset to the first reset voltage by turning on the first reset means and then rendered to be in a floating potential state by turning off the first reset means; with constant current being supplied to the first signal lines by turning on the constant current circuit elements, each voltage at each of the charge-voltage conversion terminals is read out to each of the first signal lines via each voltage signal output means for a predetermined period of time so that each voltage is stored in each of the first signal lines; and noise signals in the respective pixels in the one row are output by turning off the constant current circuit elements and reading out each voltage stored in each of the first signal lines, and wherein the solid-state imaging device executes an optical signal read-out operation in which signal charges accumulated in each of the photoelectric conversion elements in the respective pixels in one row selected by the first scanning means are transferred to each of the charge-voltage conversion terminals by the transfer means; with constant current being supplied to the first signal lines by turning on the constant current circuit elements, each signal voltage-converted by each of the charge-voltage conversion terminals is read out to each of the first signal lines via each voltage signal output means for the predetermined period of time so that each voltage signal is stored in each of the first signal lines; and optical signals in the respective pixels in the one row are output by turning off the constant current circuit elements and reading out each voltage signal stored in each of the first signal lines.

2. The solid-state imaging device according to claim 1, wherein the noise signal read-out operation for outputting noise signals from respective pixels in the one row and the optical signal read-out operation for outputting optical signals from respective pixels in the one row are alternately repeated while the first scanning means changes its selection for the pixels in the column direction.

3. The solid-state imaging device according to claim 2, further comprising:
 a plurality of second signal lines, each of the second signal lines being connected to a plurality of the first signal lines;
 a plurality of second reset means for resetting a voltage at each of the second signal lines;
 a plurality of signal amplification means for causing each of the second signal lines to output signals; and
 a second scanning means for selecting one among the first signal lines connected to each of the second signal lines so as to cause the selected first signal line to output signals to the corresponding second signal line,
 wherein the noise signal read-out operation for outputting noise signals from respective pixels in the one row and the optical signal read-out operation for outputting optical signals from respective pixels in the one row are alternately and repeatedly executed on pixels corresponding to a plurality of the first signal lines connected to each of the second signal lines while each of a plurality of the second reset means is resetting a voltage at each of the second signal lines.

4. The solid-state imaging device according to claim 1,
 wherein each of the pixels comprises at least two of the photoelectric conversion elements, the transfer means of the same number as the photoelectric conversion elements, and a single of the charge-voltage conversion terminal connected in parallel to the photoelectric conversion elements and the transfer means, and
 wherein the optical signal read-out operation reads optical signals from one of the photoelectric conversion elements in each of the pixels in one row selected by the first scanning means.

* * * * *